W. B. ROYER.
SILENT INLET VALVE FOR CLOSET TANKS.
APPLICATION FILED AUG. 13, 1915.

1,173,871.

Patented Feb. 29, 1916.

Witness
Wm F Doyle

Inventor
W. B. Royer
By A. L. Hough
Attorney

UNITED STATES PATENT OFFICE.

WILLIAM B. ROYER, OF BALTIMORE, MARYLAND.

SILENT INLET-VALVE FOR CLOSET-TANKS.

1,173,871.  Specification of Letters Patent.  Patented Feb. 29, 1916.

Application filed August 13, 1915. Serial No. 45,351.

*To all whom it may concern:*

Be it known that I, WILLIAM B. ROYER, a citizen of the United States, residing at Baltimore, in the State of Maryland, have invented certain new and useful Improvements in Silent Inlet-Valves for Closet-Tanks, of which the following is a specification, reference being had therein to the accompanying drawing.

This invention relates to new and useful improvements in silent inlet valves for closet tanks and consists of a simple and efficient device of this nature so arranged that the tank may be silently refilled after the same has been flushed.

More specifically, the invention consists of an inlet valve for tanks in which spring-pressed mechanism is provided to offset the pressure of the water being fed to the tank.

My invention consists of a simple and efficient device of this nature having various details of construction, combinations and arrangements of parts which will be hereinafter fully described, shown in the accompanying drawings and then specifically defined in the appended claims.

I illustrate my invention in the accompanying drawings, in which:—

Figure 1:
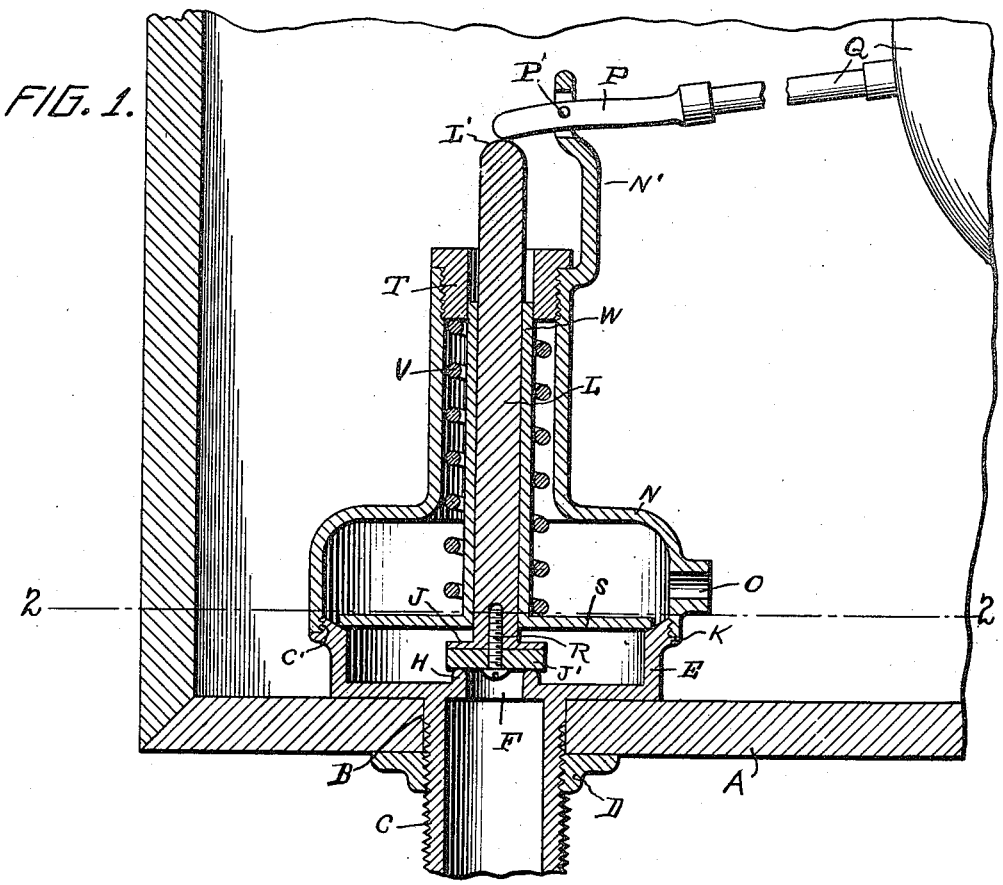
Figure 2:
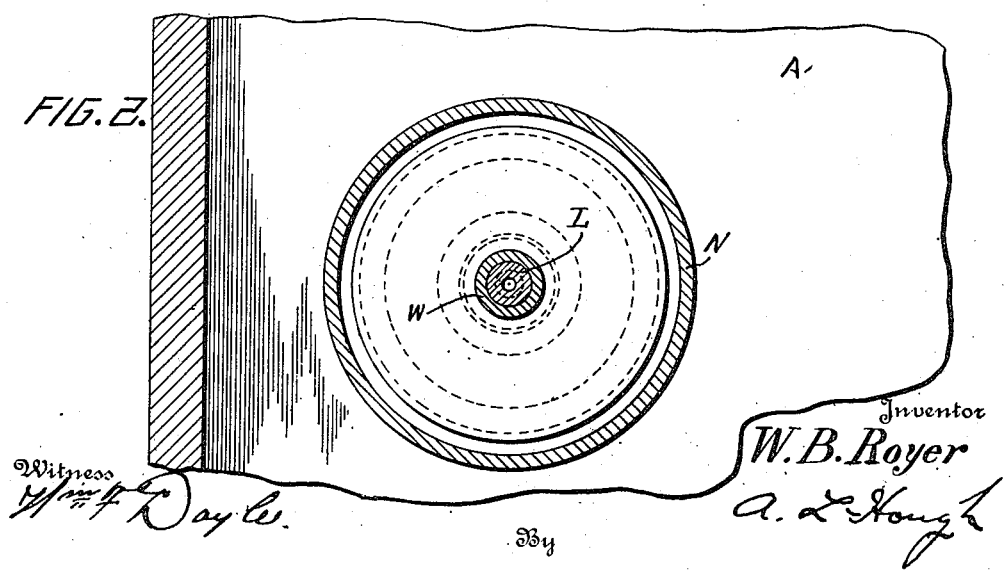

Figure 1 is a vertical central sectional view through a valve made in accordance with my invention. Fig. 2 is a sectional view on line 2—2 of Fig. 1.

Reference now being had to the details of the drawings by letter, A designates a tank having an opening B in the bottom thereof for the reception of the filling pipe C, which latter is circumferentially threaded and is engaged by an interiorly threaded collar D which is adapted to bear against the under surface of the tank, as shown, to hold the pipe in place. Said pipe has its upper portion outwardly flaring, forming a chamber E, centrally apertured as at F about which is a circular valve seat H. Said chamber of the pipe has an annular shoulder, designated by letter K, which is threaded to receive the threaded portion of the casing N. Said casing has an exit opening O whereby water is allowed to flow from the latter to the tank and the upper portion of the casing has a projecting arm N' upon which a lever P is pivoted at P' and having a forked end to which the float stem Q is attached. A valve, designated by letter J, is formed at the lower end of the stem L, and a washer J' is fastened by means of a screw R to the bottom of the stem, the upper end of the stem being rounded as at L' and against which the end of the lever is adapted to bear.

A bushing, designated by letter T, has circumferential threads and is adapted to engage the interior threads in the inner surface of the upright portion, of the casing N. A pressure disk, designated by letter S, is adapted to rest upon the upper inclined edge C' of the chamber E and has a tubular stem W through which the stem L passes freely. A coiled spring V is mounted about said tubular stem and bears intermediate the threaded bushing T and the disk S, said bushing T serving to regulate the tension of the spring V according to the pressure of the water in the inlet pipe C.

In operation, when the tank is flushed, the lever P to which the float is attached will tilt as the float lowers and the valve J will unseat incident to the pressure of the water entering the pipe C. When the pressure of the water entering the chamber E at the upper end of the pipe C and coming in contact with the pressure disk S is sufficient to overcome the tension of the spring V, the latter will yield and allow the water to pass into the casing N and make exit at O, the pressure disk preventing any singing noise incident to the water passing by the seat of the valve. As the water rises in the tank, the float will tilt the lever P and cause the valve to seat and shut off the water, after which the spring V will return the disk S to its normal position upon the inclined edge C'.

By the manipulation of the threaded bushing T, the tension upon the spring will be regulated according to the pressure of the water system which is connected to the inlet pipe C. I have found that, by the provision of a spring-pressed pressure regulating device made in accordance with my invention, a practically silent valve inlet is afforded, dispensing entirely with the singing noise which is common with the ordinary inlets now in use.

What I claim to be new is:—

1. A silent inlet valve for closet tanks, comprising an inlet pipe for attachment to a pipe, a chamber communicating with said pipe, a float-actuated valve regulating the communicating opening between the pipe and chamber, and a spring-pressed pressure regulating member independent of the valve.

2. A silent inlet valve for closet tanks, comprising an inlet pipe for attachment to a pipe, a chamber communicating with said pipe, a casing fitted to the wall of said chamber and having an exit opening, a float-actuated valve regulating the communicating opening between the pipe and chamber, and a spring-pressed pressure member independent of the valve and regulating the passage of water between said chamber and casing.

3. A silent inlet valve for closet tanks, comprising an inlet pipe for attachment to a pipe, a chamber communicating with said pipe, a casing fitted to the wall of said chamber and having an exit opening, a float-actuated valve regulating the communicating opening between the pipe and chamber, a spring-pressed pressure member adapted to seat upon the wall of said chamber and adapted to offset pressure of the water which is fed into the chamber.

4. A silent inlet valve for closet tanks, comprising an inlet pipe for attachment to a pipe, a chamber communicating with said pipe, a casing fitted to the wall of said chamber and having an exit opening, a float-actuated valve regulating the communicating opening between the pipe and chamber, a pressure disk, and a spring tension means for holding said disk against the wall of the chamber.

5. A silent inlet valve for closet tanks, comprising an inlet pipe for attachment to a pipe, a chamber communicating with said pipe, a casing fitted to the wall of said chamber and having an exit opening, a float-actuated valve regulating the communicating opening between the pipe and chamber, a pressure disk having a hollow stem movable over the stem of said valve, and an adjustable tension means bearing against said disk.

6. A silent inlet valve for closet tanks, comprising an inlet pipe for attachment to a pipe, a chamber communicating with said pipe, a casing fitted to the wall of said chamber and having an exit opening, a float-actuated valve regulating the communicating opening between the pipe and chamber, the top wall of said chamber being beveled, a pressure disk resting thereon having a hollow stem, an adjustable shell having threaded connection with the casing, and a spring interposed between said pressure disk and shell.

7. A silent inlet valve for closet tanks, comprising an inlet pipe having a chambered portion with a communicating opening between the same, said chambered portion adapted to bear against the tank, a ring about the pipe for engagement with the bottom of the tank, a raised valve seat between the pipe and chamber, a casing fitted about said chamber and provided with an upright portion, a shell having threaded connection with the latter, a float-actuated valve adapted to engage said seat, a pressure disk seated upon the wall of the chamber, and a spring interposed between said shell and disk.

In testimony whereof I hereunto affix my signature in presence of two witnesses.

WILLIAM B. ROYER.

Witnesses:
A. L. HOUGH,
A. R. FOWLER.